US006325397B1

(12) United States Patent
Pascoe et al.

(10) Patent No.: US 6,325,397 B1
(45) Date of Patent: *Dec. 4, 2001

(54) MODULAR POWER RUNNING BOARD

(75) Inventors: David M. Pascoe, Newmarekt; Brad E. Watson, Sharin, both of (CA)

(73) Assignee: Decoma Exterior Trim Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/511,078

(22) Filed: Feb. 23, 2000

Related U.S. Application Data

(60) Provisional application No. 60/121,332, filed on Feb. 23, 1999.

(51) Int. Cl.[7] ............................................. B60R 3/02
(52) U.S. Cl. ......................... 280/166; 280/163; 280/169
(58) Field of Search ..................... 280/166, 164.1, 280/169, 163, 165

(56) References Cited

U.S. PATENT DOCUMENTS

| | | | | |
|---|---|---|---|---|
| 2,583,894 | * | 1/1952 | Shuck ................................... | 280/166 |
| 3,164,394 | * | 1/1965 | Husko et al. ........................ | 280/166 |
| 3,762,742 | * | 10/1973 | Bucklen ............................... | 280/166 |
| 3,887,217 | | 6/1975 | Thomas ............................... | 280/166 |
| 4,110,673 | * | 8/1978 | Nagy et al. .......................... | 318/466 |
| 4,116,457 | | 9/1978 | Nerem et al. ....................... | 280/166 |
| 4,623,160 | * | 11/1986 | Trudell ................................ | 280/166 |
| 5,085,450 | * | 2/1992 | DeHart, Sr. ......................... | 280/166 |
| 5,137,294 | | 8/1992 | Martin ................................. | 280/166 |
| 5,375,864 | * | 12/1994 | McDaniel ........................... | 280/166 |
| 5,498,012 | * | 3/1996 | McDanial et al. .................. | 280/166 |
| 5,538,269 | * | 7/1996 | McDaniel et al. .................. | 280/166 |
| 5,697,626 | | 12/1997 | McDaniel et al. .................. | 280/166 |
| 5,842,709 | * | 12/1998 | Maccabee ........................... | 280/166 |
| 5,957,237 | * | 9/1999 | Tigner ................................. | 182/127 |
| 6,149,172 | * | 11/2000 | Pascoe et al. ....................... | 280/166 |
| 6,179,312 | * | 1/2001 | Paschke et al. ..................... | 280/166 |

FOREIGN PATENT DOCUMENTS

| | | |
|---|---|---|
| 8711088 | 11/1987 | (DE) . |
| 4341134 | 6/1995 | (DE) . |
| 2670445 | 6/1992 | (FR) . |

OTHER PUBLICATIONS

PCT Search Report re: PCT/CA00/00179 dated Jul. 17, 2000.
Page 1) Kodiak Brochure, Kodiak SideWinder (Automatic Vehicle Step), 1999.
Page 2) Kodiak Brochure, Kodiak SideWinder Applications–(year, vehicle, description), 1999.
Page 3) Kodiak Brochure, Greatly Eases Getting In or Out of Pickups and Sport Utility Vehicles, 1999.
Kodiak SideWinder Applications Brochure–(year vehical/ description/ vehicle fitment/part number), 1999.

* cited by examiner

*Primary Examiner*—Daniel G. DePumpo
*Assistant Examiner*—J. Allen Shriver
(74) *Attorney, Agent, or Firm*—Pillsbury Winthrop LLP

(57) ABSTRACT

A power retractable running board assembly for a motor vehicle includes a substantially sealed housing assembly, a running board, a parallel linkage, a gear assembly, and a motor assembly. The running board presents an upper load carrying surface. The gear assembly is disposed in the sealed housing assembly and coupled to an arm of the parallel linkage. The motor assembly is drivingly coupled with the gear assembly and is constructed and arranged to pivot the running board between deployed and stored positions.

14 Claims, 5 Drawing Sheets

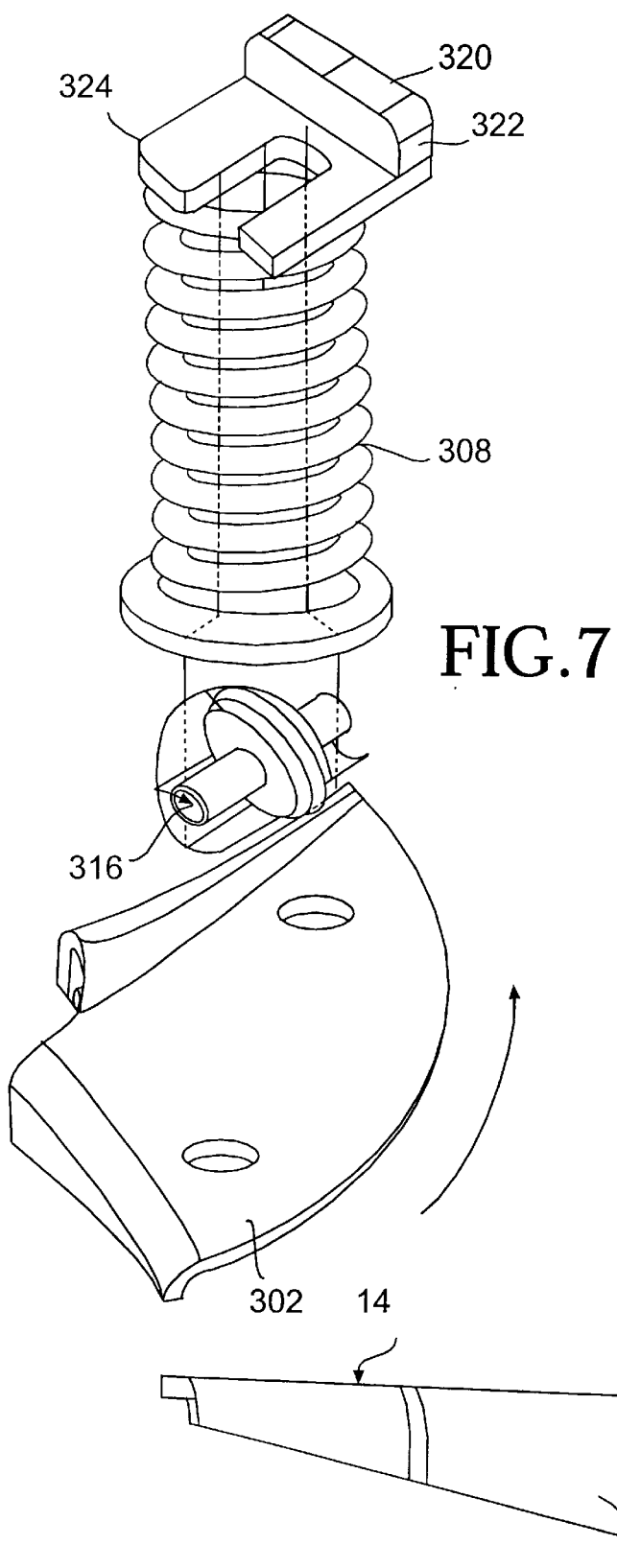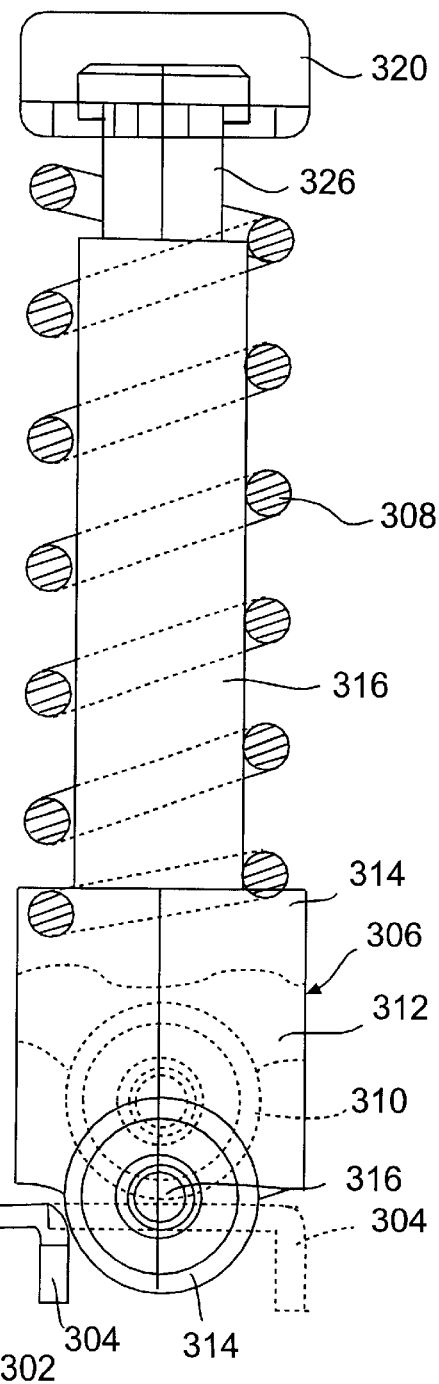

MODULAR POWER RUNNING BOARD

This application claims benefit of provisional application 60/121,332, filed Feb. 23, 1999.

FIELD OF THE INVENTION

The present invention relates to power retractable running boards used to assist passengers entering and exiting high ground clearance vehicles.

BACKGROUND OF THE INVENTION

In recent years, the popularity of sport utility vehicles has risen tremendously. Because of the high ground clearance of these vehicles, the vehicle floor level is higher than that of a typical passenger automobile. Some individuals have experienced difficulty entering and exiting sport utility and similar high ground clearance vehicles.

Running boards have been used to assist passengers in entering and exiting high ground clearance vehicles. The conventional running boards have typically included a variety of stationary step or bar structures rigidly mounted to the vehicle. Stationary running boards have many disadvantages, however. For example, if a stationary running board is positioned at an optimum height to help most passengers, the stationary running board reduces ground clearance of the vehicle. If the stationary running board is positioned so that desirable ground clearance is maintained, the stationary running board is too high to help most passengers enter or leave the vehicle. Stationary running boards also detract from the vehicle styling, undesirably increase the vehicle width, and may even increase the vehicle width beyond the legal limit. Most stationary running boards are also very narrow in the transverse or cross-vehicle direction and present only a small stepping surface for a passenger's foot.

The patent literature has proposed various retractable vehicle running boards in order to resolve some of the problems associated with stationary running boards. For example, U.S. Pat. No. 3,762,742 proposes to provide a step that is pivoted about an axis that is angled in an outboard direction as it extends upwardly. While such angling of the pivotal axis enables the running board to be positioned closer to the ground when deployed in comparison to its position when stored, the optimum running board positioning in the two positions is not achieved. In addition, many of the proposed retractable running boards, such as that disclosed in the aforementioned '742 patent, do not provide the moving mechanical parts of the retractable running board with effective protection from the environment or from damage caused by dirt and other objects thrown by the vehicle wheels when the vehicle is moving.

More particularly, on four door sport utility vehicles the lower edge of the door is contoured to as a result of the position of the rear wheel well. A running board as shown in the prior art would be positioned too far forward and would thus be of little assistance on entering the rear door.

Furthermore, several of the proposed mechanisms for powered retractable running boards, including the aforementioned '742 patent, do not provide a means for retracting the step from the deployed position in the event of a power failure, or for preventing damage to the step in the event that the deployed step forcibly encounters an object.

SUMMARY OF THE INVENTION

It is an object of the present invention to overcome the disadvantages of the proposed prior art devices as discussed above. Accordingly, the present invention provides a power retractable running board assembly for a motor vehicle comprising a substantially sealed housing assembly, a running board having a parallel linkage for pivotally mounting the running board to a vehicle, a gear assembly, and a motor assembly. The running board presents an upper load carrying surface. The gear assembly is disposed in the sealed housing assembly and coupled to the running board. The motor assembly is drivingly coupled with the gear assembly and is constructed and arranged to pivot the running board about the axis and thereby drive the running board between deployed and stored positions.

The present invention provides a power retractable running board assembly for a motor vehicle comprising a running board, a parallel linkage, a gear assembly, a motor assembly, and a spring-biased clutch assembly. The running board presents an upper load carrying surface. The gear assembly is coupled to the running board, and the motor assembly is drivingly coupled with the gear assembly. The motor assembly is constructed and arranged to pivot the parallel linkage and thereby drive the running board between deployed and stored positions. The running board moves in an outboard and rearward vehicle direction to the deployed position. The gear assembly includes a worm gear operatively connected to the motor assembly and a meshing gear operatively connected to the parallel linkage. The worm gear and the meshing gear are disposed in cooperative meshing engagement relation that prevents the running board from backdriving the motor assembly so that the running board is retained in the deployed position and is inhibited from returning to the stored position after it has reached the deployed position. The spring biased clutch assembly couples the gear assembly with the running board and includes clutch surfaces normally forced into coupling engagement by a spring structure so that movement of the gear assembly generates corresponding movement of the running board. The clutch surfaces are capable of relative movement to one another when the running board is in the deployed position and a greater than threshold force is applied to the running board to overcome the force provided by the tension spring and thereby enable the running board to be moved relative to the gear assembly and thus moved towards the stored position.

BRIEF DESCRIPTION OF THE DRAWINGS

FIG. 7 is an perspective view of the stop structure utilized in the embodiment illustrated in FIG. 3; and FIG. 8 is a side view of the stop structure utilized in the embodiment illustrated in FIG. 3.

DETAILED DESCRIPTION OF THE PREFERRED EMBODIMENTS

Figure 1:
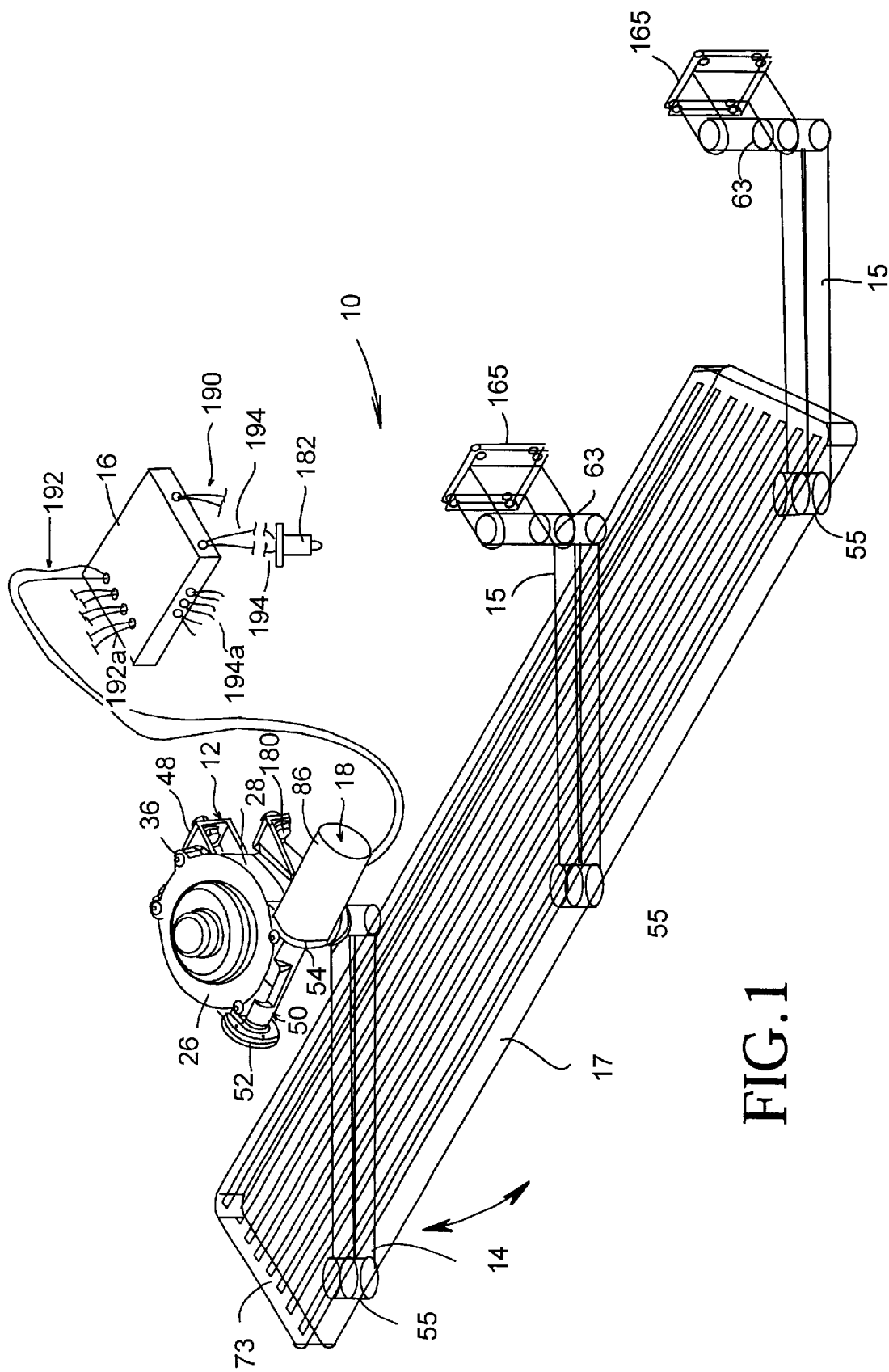
FIG. 1 is a perspective view of a modular power running board assembly according to the present invention including an electronic controller assembly thereof and a motor vehicle door controlled switching device electrically interconnected to the electronic controller assembly.

A modular power running board assembly of the present invention is generally indicated by reference numeral 10. The modular power running board assembly 10 includes a housing assembly 12, a pivoting drive arm 14, pivoting idler arms 15, an electronic control unit 16, a running board 17, a motor assembly 18, a worm drive gear assembly 20, and a spring loaded clutch assembly 22.

The running board 17 has an essentially rectangular top wall 73 providing an upwardly facing treaded surface. The running board 17 is hingedly connected to the pivoting drive arm 14 and idler arms 15 at pivots 55. Pivots 55 generally comprises a trunion shaft extending through bore in the end of arms 15 and retained in place by a retaining ring.

Idler arm 15 each has a hub structure 63 which pivotally connects the idler arms 15 to bracket 165 which is constructed and arranged to be mounted to the frame of the vehicle.

Idler arms 15 and drive arm 14 form the parallel linkage which pivotally mounts the running board 17 to the vehicle for reciprocating movement between an operative or deployed condition, extending generally outwardly of the vehicle and a stored or retracted condition, wherein the running board is tucked beneath the vehicle. The running board 17 will move relative to the vehicle while remaining substantially parallel thereto.

Figure 3:
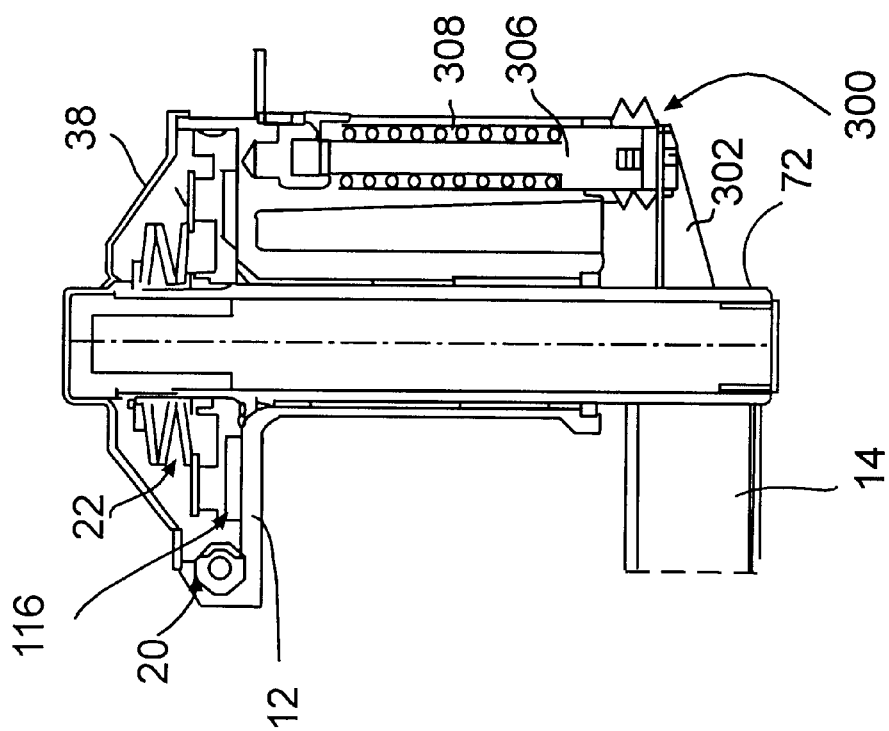
FIG. 3 is a partial sectional view of the drive of the modular power running board assembly of FIG. 2.
Figure 2:
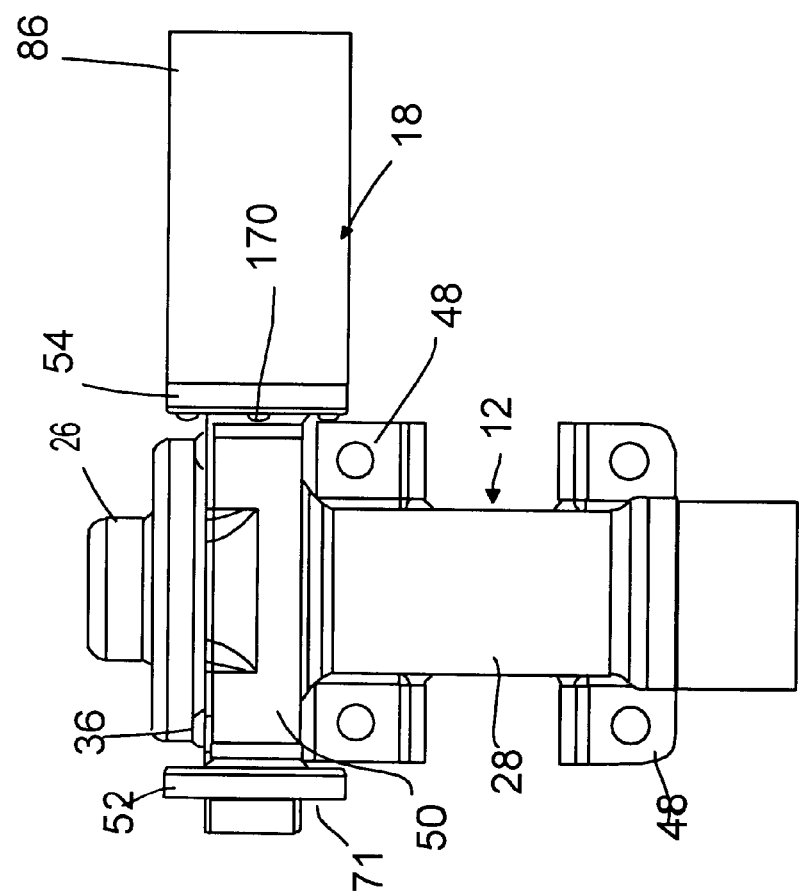
FIG. 2 is a front elevational view of a drive of the modular power running board assembly of FIG. 1.

Referring to FIGS. 2 and 3, the housing assembly 12 includes a cover structure 26 and a main housing structure 28. The cover structure 26 is secured to the main housing structure 28 by a plurality of cover screws 36. When the cover structure 26 is secured to the housing structure 28, the cover structure 26 and the housing structure 28 cooperate to define a housing assembly chamber 38 within the housing assembly 12. The housing assembly 12 includes a rear bracket 48 and a gear housing portion 50.

Figure 4:
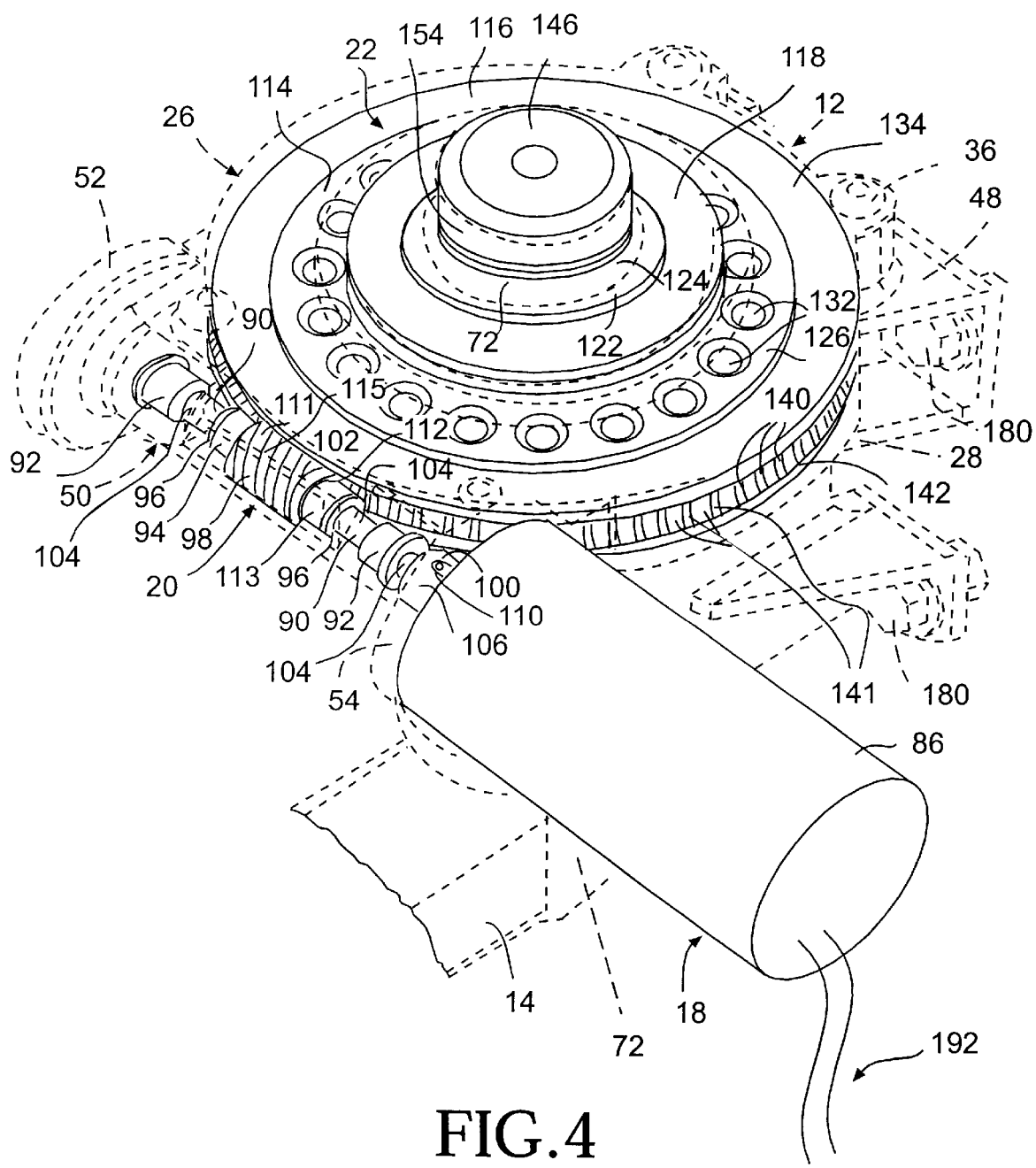
FIG. 4 is a perspective view of the drive of the modular power running board assembly of FIG. 2.
Figure 5:
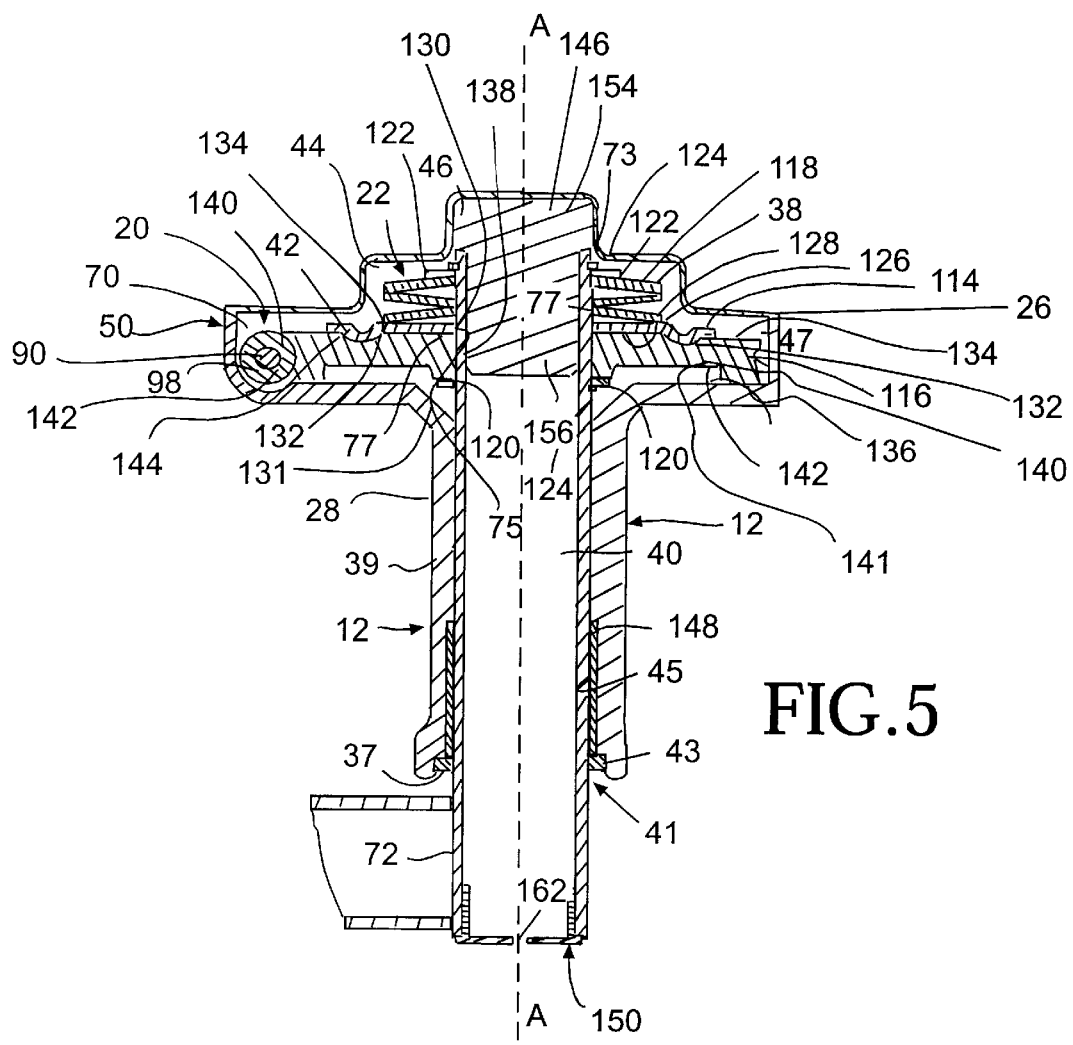
FIG. 5 is a partial cross sectional view of the drive of the modular power running board assembly of FIG. 2.
Figure 6:
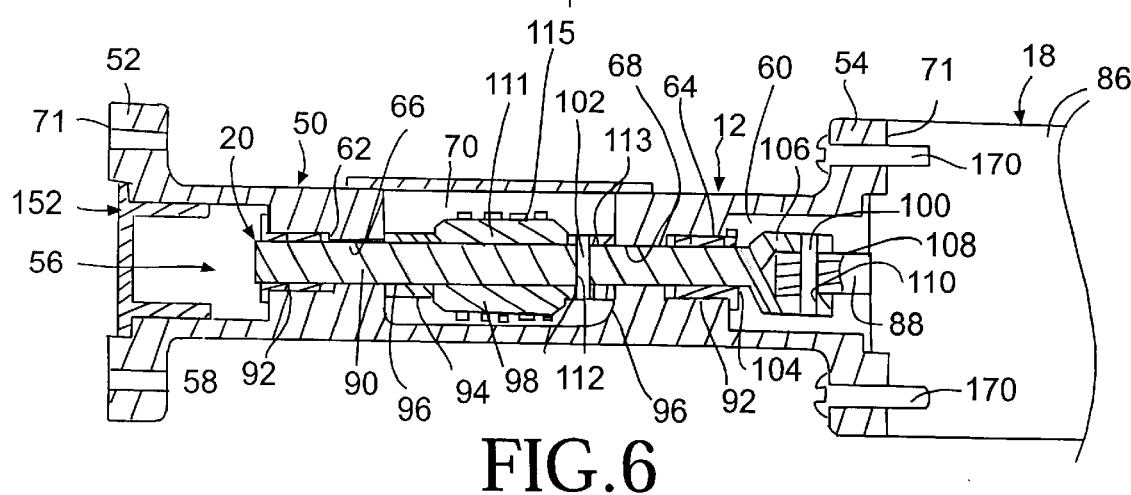
FIG. 6 is a fragmentary cross sectional view of a portion of the modular power running board assembly taken through the line 6—6 in FIG. 3.

Referring to FIGS. 4–6, the housing assembly chamber 38 includes a lower cylindrical chamber portion 40, an enlarged diameter clutch chamber portion 42, a spring chamber portion 44, and an upper chamber portion 46. The lower cylindrical chamber portion 40 is defined by a hollow cylindrical sleeve portion 39 of the main housing 28. The sleeve portion 39 has a downwardly facing opening 41. The sleeve portion 39 has an interior surface thereof which defines a lower annular recess 43 which surrounds the opening 41. The interior surface also defines a cylindrical recess 45 above the annular recess 43. Recess 43 receives a spring loaded lip seal 37, while recess 45 receives a bushing or bearing 148.

The housing portion 50 defines a plurality of identical, oppositely facing bellhouse structures, including a first bellhouse structure 52 and a second bellhouse structure 54. The housing 50 defines an essentially symmetrical housing chamber 56. The chamber 56 defines two identical cylindrical outer chamber portions 58 and 60, two identical cylindrical intermediate chamber portions 62 and 64 of relatively reduced diameter, two identical cylindrical inner chamber portions 66 and 68 of an even further reduced diameter, and a central chamber 70 which opens into and is continuous with the spring chamber portion 44. The two identical portions 58 and 60, the two identical portions 62 and 64, and the two identical portions 66 and 68 of the housing chamber 56 are symmetric with respect to the longitudinal center axis of the housing chamber 56. Each bellhouse structure 52 and 54 defines a ring-shaped planar surface 71 at the respective ends thereof The main housing structure 28 and cover structure 26 are preferably a cast aluminum component, although any suitable material known in the art can be used.

The gear assembly 20 and the spring loaded clutch assembly 22 are enclosed within the housing assembly 12. The gear assembly 20 includes a worm drive shaft member 90, a plurality of identical longitudinally spaced worm drive bushings 92, a spacer washer member 94, a plurality of thrust washers 96, a worm member 98, a first retainer pin member 100, and a second retainer pin member 102. The worm drive shaft member 90 has a radially enlarged end portion 106. The enlarged end portion 106 defines a longitudinally extending central bore 108, and a transversely extending first aperture 110 intersecting the bore 108. The enlarged end portion 106 is used to connect shaft 106 to motor assembly 18.

The worm member 98 can be of any conventional configuration and is fixed to shaft 90 for rotation therewith. The worm member 98 shown in the drawings includes a radially enlarged cylindrical portion 111 and a radially smaller cylindrical portion 113. The second retainer pin member 102 extends through an aperture 112, which extends through the cylindrical portion 113 and the shaft 90 to rotatably couple the shaft 90 with the worm member 98. The spacer washer member 94 keeps the asymmetrical worm member 98 symmetrically positioned within the central chamber 70 of the gear housing portion 50. More specifically, the pair of thrust washer members 96, the spacer washer member 94, and the worm member 98 surround the portion of the worm drive shaft member 90 that extends through the central chamber 70 of the bellhouse bore 56. The spacer washer member 94 is positioned adjacent the enlarged cylindrical portion 111 of the worm member 98. The first thrust washer member 96 is mounted on the worm drive shaft member 90 and is positioned between the gear housing 50 and the spacer washer member 94. The second thrust washer member 96 is mounted on the worm drive shaft member 90 and is positioned between the small cylindrical portion 113 of the worm member 98 and the gear housing 50. The spacer washer member 94, thrust washer members 96, and the small cylindrical portion 113 of the worm member 98 cooperate to hold the enlarged cylindrical portion 111 of the worm member 98 in a central portion of the central chamber 70 of the bellhouse bore 56. A plurality of spiral threads 115 are defined on the exterior cylindrical surface of the enlarged cylindrical portion 111.

The motor assembly 18 includes a casing structure 86 which contains a conventional position sensing and encoding electrical motor (not shown) which is capable of bi-directionally rotating a conventional motor shaft structure 88. It should be appreciated that the casing structure 86 may optionally be considered as part of the entire housing assembly 12, which housing assembly maintains the gear and motor components sealed from the external environment.

The motor assembly 18 is secured to the ring-shaped planar surface 71 of the second bellhouse structure 54 with a plurality of fasteners 170. The motor shaft structure 88 extends partially within the chamber portion 60 of the bellhouse structure 54. The motor shaft structure 88 is received within the central bore 108 of the enlarged end portion 106 of the worm drive shaft member 90, and the worm drive shaft member 90 is fixed for rotation with the motor shaft structure 88 by the first retainer pin member 100. Particularly, the pin 100 extends through the aperture 110 in the enlarged end portion 106 of the worm drive shaft member 90 and an aligned aperture in the motor shaft 88.

The cylindrical shaft portion 104 of the worm drive shaft member 90 extends rotatably through the cylindrical chamber portion 60, through both cylindrical chamber portions 62 and 64, through both cylindrical chamber portions 66 and 68 and through the central chamber 70 of the bellhouse bore 56. One worm drive bushing member 92 is secured within each of the cylindrical second portions 62 and 64 of the bellhouse bore 56 and each surrounds a portion of the cylindrical shaft portion 104 of the worm drive shaft 90. The worm drive bushing members 92 secured within each of the cylindrical second portions 62 and 64 of the bellhouse bore 56 mount the worm drive shaft member 90 for low friction rotation within the housing portion 50.

The clutch assembly 22 includes a clutch structure, generally designated 114, a meshing gear structure, generally designated 116, a spring structure 118 comprising a plurality of belleville spring washers, a thrust washer structure 120, an annular shim structure 122, and a pair of retainer ring structures 124. It will be appreciated that while the meshing gear structure 116 forms part of the clutch assembly, it also may be considered to form part of the gear assembly 20.

The clutch structure 114 constitutes a first clutch member connected to the drive arm. Preferably, the clutch structure 114 is in the form of a thin disc which has a first substantially planar surface 126 and a second substantially planar surface 128 on opposite sides. The clutch structure 114 further defines a central bore 130 which extends from the first planar surface 126 to the second planar surface 128. A plurality of tab structures 131 are circumferentially spaced along the edge defining the central bore 130 of the clutch structure 114 and are recessed within the broached grooves 77 of rotation tube 72 so as to rotatably couple the clutch structure 114 with the rotation tube 72.

The clutch structure 114 (or first clutch member) has a plurality of circumferentially spaced, integrally formed spherical projections or detents 132. The centers of detents 132 are preferably spaced an equal radial distance from the longitudinal axis of the central bore 130, and project outwardly from the lower or second planar surface 128 of the clutch structure 114. The detents 132 appear as depressions on the upper planar surface 126. In the embodiment of the clutch structure 114. shown in the figures, the clutch structure 114 is formed from stamped sheet metal.

The meshing gear structure 116 comprises a second clutch member driven by motor assembly 18. Preferably, gear structure 116 comprises thick disc which has an upper surface 134, a lower or opposite surface 136, and a central bore 138 which extends through the disc. A plurality of identical and circumferentially spaced tooth-like structures 140 are defined between the upper and lower surfaces 134, 136 at the periphery 142 of the meshing gear structure 116 in a conventional manner. Notches 141 between the tooth-like structures 140 are dimensioned to rotationally receive and to rotationally engage in a conventional manner the plurality of spiral threads 115 defined on the exterior cylindrical surface of the enlarged cylindrical portion 111 of the worm member 98. The worm member 98 and the meshing gear structure 116 are therefore capable of rotational interengagement in a manner well known to one skilled in the art. A plurality of equally spaced spherical depressions 144, the centers of which are spaced an equal radial distance from the longitudinal axis of the central bore structure 138, are formed in the upper surface 134 of the meshing gear structure 116.

The modular power running board assembly 10 further includes an upper shaft guide structure, generally designated 146, a plain bearing structure 148, and a lower cap structure, generally designated 150. The upper shaft guide structure 146 has a large diameter cylindrical first end portion 154 at one end thereof, and a smaller diameter portion 156 received within the top of rotation tube structure 72. The plain bearing structure 148 is an elongated tubular cylindrical structure preferably made of nylon or similar material received in recess 45 in sleeve portion 39. Bearing structure 148 mounts the rotation tube structure 72 for rotation within sleeve portion 39 of main housing 28.

The rotation tube structure 72 is prevented from being longitudinally downwardly displaced with respect to the sleeve 39 in a direction away from the cover structure 26 of the housing assembly 12 by the vertical support of the upper retainer ring 124, which is supported by the remainder of the clutch assembly 22, including the shim structure 122, the spring structure 118, the clutch structure 114, the meshing gear structure 116, which is in turn supported by the upward facing surface of the housing structure 28 at the lower surface 136 of the meshing gear structure 116.

The shim structure 122 is mounted around the rotation tube structure 72 and is positioned immediately below the upper retainer ring structure 124 received in the upper annular groove 73. The thrust washer structure 120 is mounted about the rotation tube structure 72 immediately adjacent the lower retainer ring structure 124 received in the lower annular groove 75. The central bore 138 of the meshing gear structure 116 is rotatably mounted about the rotation tube structure 72 on the thrust washer structure 120. Thus, the meshing gear structure 116 is rotatable with respect to both the rotation tube structure 72 and the housing structure 28.

The clutch structure 114 is fixed to the rotation tube structure 72 for rotation therewith. More specifically, the tab structures 131 formed in the cylindrical central bore 130 of the clutch structure 114 engage the broached grooves 77 formed on the rotation tube structure 72 to prevent the clutch structure 114 from rotating with respect to the rotation tube structure 72. The meshing gear structure 116 is, on the other hand, rotatable with respect to the rotation tube structure 72, or vice versa. However, when the spherical detents 132 on the clutch structure 114 are received within the spherical depressions 144 formed in the upper surface of meshing gear structure 116, the clutch 114 couples the tube structure 72 to the gear structure 116 for rotation therewith. The plurality of belleville spring washers constituting the spring structure 118 are mounted about the rotation tube structure 72 between the shim structures 122 and the clutch structure 114. The spring structure 118 biases the clutch structure 114 axially downwardly so that the spherical depressions 144 are held in releasable engagement with the spherical depressions 144 in the meshing gear structure 116. Thus, the respective clutch surfaces of the clutch members 114 and 116 are forced into coupling engagement by the spring structure so that movement of the gear assembly generates corresponding movement of the running board. The retainer ring structures 124 of the clutch assembly 22 are each rigidly and non-slidable attached to the rotation tube structure 72 to provide support to the shim structure 122 and thrust washer 120 therebetween.

The operation of the modular power running board assembly 10 will now be considered. The drive arm 14 is bi-directionally movable between the retracted and the extended positions by the motor assembly 18, which is controlled electronically by the logic circuitry within the electronic control unit 16 shown in FIG. 1. The electronic control unit 16 is electro mechanically connected to the vehicle door disposed above and operationally associated with the modular power running board assembly 10. The electronic control unit 16 causes the drive arm 14 to pivot to the extended position when the vehicle door associated therewith is opened, and to pivot to the retracted position when the vehicle door is closed.

The electronic control unit 16 is mounted within the vehicle 161, remote from the housing assembly 12, and is electrically connected to the motor assembly 18, the wiring harness (not shown) of the vehicle 161, and a door actuated switch member 182 which is part of the vehicle door with which the modular power running board assembly 10 is associated. In another preferred embodiment (not illustrated), the control unit 16 is physically mounted directly to the housing assembly or to the motor, and is electrically connected to the motor.

The switch member 182 is part of the vehicle 161 and is controlled in a conventional manner by the vehicle door (not shown). The wiring harness supplies the electrical power from the vehicle electrical system to the electronic control unit 16 of the modular power running board assembly 10 through the electrical wire members generally designated 190. The structure and operation of a conventional switch member 182 which is operationally interconnected to a vehicle door is well known. It is understood by one skilled in the art that such switch members 182 are toggled by the opening or the closing of the vehicle door associated therewith to open and close an electrical circuit. Wire members generally designated 192 provide electrical connection between the electronic control unit 16 and the motor assembly 18 so that the electronic control unit 16 can supply electrical power from the vehicle electrical system to the motor assembly 18 to effect the bi-directional operation thereof. The wire members generally designated 194 provide electrical communication between the electronic control unit 16 and the vehicle door switch member 182.

In a preferred embodiment, the switch 182 is a door ajar switch in the door latch. The motor assembly 18 is energized to move the running board from the stored position to the deployed position upon receiving a signal from the door ajar switch 182 indicating that the vehicle door has been opened. The motor assembly is energized to return the running board to the stored position upon receiving a signal from the door ajar switch indicating that the vehicle door has been closed.

When the drive arm 14 is in the retracted position and the vehicle door is unlatched and pivoted outwardly from the closed to the open position, the switch member 182 associated therewith is activated and sends a contact signal to the electronic control unit 16. The electronic control unit 16 in response to this first control signal supplies an appropriate voltage to the motor assembly 18 to cause the motor assembly 18 to begin rotational movement in a first rotational direction which will move the drive arm 14 to the extended position. Specifically, the motor shaft structure 88 of the motor assembly 18 rotates the worm drive shaft member 90 in a first rotational direction which in turn rotates the worm member 98. The worm member 98 rotates the meshing gear structure 116. The gear structure 116, in turn, through the engagement between the spherical depressions 144 thereof and the spherical detents 132 on the clutch structure 114, rotates the clutch structure 114. Rotation of clutch structure 114 rotates the rotation tube structure 72. This causes the drive arm 14 to pivot outwardly toward the extended position.

Stop structure 300 and the controller 16 are used to turn-off the electrical motor of the motor assembly 18. The stop structure 300 is engaged by the drive arm 14 when the drive arm 14 is in the deployed position. More particularly, the drive arm 14 is provided with a sector plate structure 302 having a radially inner edge that is welded to the tubular member 72. The sector plate structure 302 has a downwardly depending flange 304 at a forward end there of that engages the stop structure 300.

Gear assembly 20 comprises a worm member or worm gear 98 operatively connected to the motor assembly 18, and the meshing gear 116 is operatively connected to the drive arm 14. The worm gear 98 and the meshing gear 116 are disposed in cooperative meshing engagement relation.

The motor assembly 18 is operable in a first driving direction to drive the worm gear 98 and hence the meshing gear 116 and the drive arm 14 from the stored position to the deployed position. The drive arm 14, preferably the sector plate structure 302 thereof, engages the stop structure 300 when the drive arm reaches the deployed position. A current spike is generated in the motor assembly 18 as a result of the motor assembly 18 meeting a resistance to movement when the drive arm 14 engages the stop structure 300. The controller 16 senses the current spike and turns off the motor assembly 18 in response to the current spike.

The drive arm 14 is retained in the deployed position after the motor assembly is shut off as a result of the meshing engagement between said worm gear 98 and the meshing gear 116, as it is known that a worm gear 98 will not be back-driven by a meshing gear. Thus, the worm gear will resist an external force applied to the drive arm in a direction away from the deployed position and towards the stored position as a result of the meshing engagement.

A movable structure 306 is disposed at an interface between the stop structure 300 and said drive arm 14. The movable structure 306 is biased by a coil spring member 308 towards a first position wherein the movable structure 306 prevents movement of the drive arm 14 beyond the deployed position. The movable structure 306 is movable against the bias of the spring member 308 to a second position (see phantom line configuration 310) that permits movement of the drive arm 14 beyond the deployed position.

Preferably, the movable structure 306 and the spring 308 form part of the stop structure 300. It is contemplated, however, that a movable structure and spring can be provided on the drive arm for engagement with a fixed stop structure in order to achieve the desired effect.

The spring member applies a biasing force to the movable structure 306 that is sufficiently large to oppose the force of the motor assembly 18 so as to create the current spike in the motor assembly 18 and thereby prevent movement of the movable structure 306 to the second position under the force of the motor assembly 18.

The biasing force of the spring member 308 permits movement of the movable structure 306 to the second position to enable the drive arm 14 to move beyond the deployed position when an external force applied to the drive arm exceeds the force applied by the motor assembly by greater than a threshold amount. In this manner, if the drive arm is impacted or forced to a sufficiently great extent in a direction beyond the deployed position, the spring member 308 will permit such movement to prevent damage to the step assembly components.

The stop structure 306 incorporates the movable structure 306 and spring 308. Particularly, the movable structure comprises a rod member 312 having a lower end that secures a rotatable wheel 314 The rotatable wheel 314 is secured to the rod member 312 by a pin 316 about which the wheel 314 rotates. The wheel 314 forms the portion of the stop structure which engages the flange portion 304 of the drive arm 14. When the drive arm 14 is forced with a greater than the threshold force towards the second position (beyond the deployed position), the flange 304 cams the wheel 314 in an upward direction against the force of coil spring 308. The wheel 314 rotates during this clamming action and then rides along the upper surface of the sector plate structure 302.

The spring 308 has a lower end seated against an enlarged diameter portion 314 of the rod 312, and an intermediate diameter portion 316 of the rod extends through the coils of spring 308. The rod 312 may be formed from a hard plastic or stainless steel material. The upper end of spring 308 is preferably fixed to the housing assembly 12. The upper end of the rod 312 is preferably mounted to a retaining block 320, which retaining block has one end 322 preferably fixed to the housing assembly. The retaining block 320 is preferably made from a plastic material.

The retaining block 320 has a fork structure 324 at another end thereof, which fork structure 324 slidingly receives a narrow diameter portion 326 of the upper end of rod 312. This sliding relation between the rod 312 and retaining block 320 permits the rod 312 to slide upwardly when the wheel is clammed upwardly.

The drive arm 14 remains in the extended position until the door of the vehicle is closed. This activates the switch member 182 associated with the vehicle door to send a second control signal to the electronic control unit 16. The electronic control unit 16, in response to this second control signal, causes the electrical motor in the motor assembly 18 to move in a second rotational direction opposite the first direction. This rotates the worm member 98, the meshing gear structure 116, and the clutch structure 114 in the direction that causes the rotation tube structure 72 to move the arm structure 74 and the running board 76 towards the retracted position adjacent the vehicle frame rail 174. The electric motor in the motor assembly 18 retracts the drive arm 14 until the running board thereof contacts the vehicle frame rail at which point a current spike is created in the electrical motor of the motor assembly 18. The current spike will be instantaneously detected by the electronic control unit 16. In response to the current spike, the control unit 16 turns off the electric motor of the motor assembly 18.

In the first embodiment, the control unit 16 will also reset the position encoder in response to the current spike. Thus, in the first-described embodiment, it can be appreciated that each time the drive arm 14 returns to the retracted position, the electronic control unit 16 provides a zeroing of the position encoder and shutoff for the motor in response to the spiking motor current.

The modular power running board assembly 10 includes a number of safety features that protect both the vehicle user and the mechanical structure of the assembly 10. For example, whenever the electric motor assembly 18 is supplied with current from the electronic control unit 16 to rotate the drive arm 14, the motor current is continuously monitored by the electronic control unit 16. This information is used by the electronic control unit 16 to provide an electronically controlled obstruction detection safety feature during the extension and retraction of the drive arm 14. More specifically, the drive arm 14 will safely deploy without applying an excessive force to an obstacle that may be in the arcuate path of the drive arm 14 when it is being rotated by the electric motor of the motor assembly 18. If the drive arm 14 encounters an obstruction as it is being extended or retracted, the motor current will rise due to the increased load on the motor. When the electronic control unit 16 detects a current passing through the motor that is outside of its characteristic range, the electronic control unit 16 will instantly turn off the motor. The obstruction causes the current to rise to a level outside of the characteristic range before the motor applies the maximum stall torque to the object causing the obstruction. This ensures that the motor does not force the drive arm 14 against an object or person with the maximum stall torque of the motor. It is within the scope of the present invention to modify the electronic control unit to vary the level or magnitude of the uncharacteristic current required to cause the electronic control unit to instantaneously reverse direction of the motor to counteract the inertia of the system and cause a dynamic breaking action for stopping the motor. Following an emergency shut off of the motor caused by an obstruction, the running board will return to the retracted position upon closing the vehicle door and actuation of switch 182. At this point, the current spike in motor assembly 18 will be detected by the electronic control unit 16. This will, in response, turn off the electric motor of the motor assembly 18 and reset the position encoder.

As another feature, the spring loaded clutch assembly 22 provides a break away feature under high load, which ensures that the internal components of the assembly are not damaged should an excessive torque be applied to the drive arm 14 which torque would tend to rotate the rotation tube structure 72 about axis A. More specifically, the internal clutch assembly 22 allows the drive arm 14 to rotate relative to the meshing gear structure 116 if an excessive force is applied to the running board 76 or arm structure 74. The clutch assembly 22 will release gear structure 116 upon the application of a predetermined threshold release torque applied about the rotation tube structure 72 of the drive arm 14.

The disengagement or release occurs between the clutch structure 114 and the meshing gear structure 116 when the release torque can overcome the clutch spring force of belleville spring washer structures 118, which provide the axially directed force necessary to maintain clutch structure 114 in rotational engagement with the meshing gear structure 116 under normal operating loads. Specifically, the belleville spring washer structures 118 are normally held in an axially compressed condition by the cooperation of the retainer ring structure 124 in the upper annular groove structure 73 on the rotation tube structure 72 and the clutch structure 114. If a torsional force of sufficient magnitude, referred to herein as the pre-defined release torque or force to overcome the force of the spring structure 118, is applied to the drive arm 14, this release torque causes the clutch structure 114 and its spherical detents 132 to cam upwardly out of engagement with the spherical depressions 144 against the spring force supplied by the belleville spring washer structures 118. This disengagement will allow the drive arm 14 to rotate until the clutch structure 114 engages the next incremental detent position. This disengagement will prevent the internal components of the clutch assembly 22 and the gear assembly 20 from being damaged.

The clutch assembly 22 enables the vehicle user to rotate the drive arm 14 manually between the extended or retracted positions in case the vehicle power system fails. This can be accomplished by applying a manual rotational force on the drive arm 14 to cause a torsional force about Axis A of the rotation tube structure 72 that is greater than the torsional force required to release the clutch assembly. When a torsional force greater than that required to release the clutch assembly is applied to the drive arm 14, the torque causes the spherical detents 132 of the clutch structure 114 to cam upwardly out of engagement with the spherical depressions 144 in the meshing gear structure 116 against the spring force applied by the belleville spring washer structures 118. This disengagement will allow the drive arm 14 to rotate about Axis A against the relatively small frictional force between spherical detents and the planar surface 134 of the meshing gear structure 116 until the spherical detents of the clutch structure 114 engage in the next incremental detent position. It can be appreciated that by repeating this process of manually applying the pre-defined release torque to the drive arm 14, and then pivoting the drive arm 14 to the next incremental detent position, the drive arm 14 can be manually moved back and forth between the extended and retracted positions.

The torsional force required to release the clutch assembly and cause rotation of the clutch structure 114 with respect to the meshing gear structure 116 is a design choice. The torsional force required to release the clutch assembly can be varied over a wide range by altering the spring force applied by spring washers 118.

The modular power running board assembly 10 includes housing components that protect the internal mechanical components from thereof inside the housing assembly 12 from dirt and environmental damage. Particularly, the gear assembly 20 and the clutch assembly 22 are fully enclosed within the housing assembly 12 by the cooperation of the cover structure 26 and the housing structure 28. The bellhouse seal structure 152 seals the end of the bellhouse bore 56 opposite the motor assembly 18 and prevents dirt and moisture from entering the bellhouse bore 56. The bellhouse seal structure 152 can seal whichever end of the bellhouse bore 56 that is opposite motor assembly 18. The lower cap structure 150 is plastic and prevents the environmental elements from entering the bottom of the rotation tube structure 72. The central aperture 162 formed in the lower cap structure 150 allows water inside the rotation tube structure 72 to drain or evaporate. The lower spring loaded lip seal 37 keeps foreign material from entering the housing assembly 12 from below that would cause wear on the rotational surface of the plain bearing structure 148 or other components.

It can be appreciated that for a passenger's side mounted embodiment, the housing assembly 12 is symmetric and thus can be easily adapted to mount on either side of the vehicle.

It thus will be seen that the objects of this invention have been fully and effectively accomplished. It will be realized, however, that the foregoing preferred embodiment of the present invention has been showed and described for the purposes of illustrating the principles of the invention and is subject to change without departure from such principles. Therefore, this invention includes all modifications encompassed within the scope of the following claims and all equivalents thereof.

What is claimed is:

1. A power retractable running board assembly for a motor vehicle comprising:

a substantially sealed housing assembly;

a running board having a parallel linkage pivotally mounting the running board on a vehicle for pivotal movement about a generally vertical axis between a stored position beneath the vehicle and a deployed position extending outwardly of the vehicle, said running board presenting an upper load carrying surface;

a gear assembly disposed in said sealed housing assembly and coupled to an arm of said parallel linkage, a motor assembly drivingly coupled with said gear assembly, said motor assembly being operable to drive said gear assembly to pivot said running board and thereby drive said running board between said deployed and stored positions, and a stop structure positioned to engage said arm of said linkage when said running board is in said deployed position, said stop structure including a movable structure disposed at a position of interface between said stop structure and said arm when said arm is in said deployed position and a spring member that biases said movable structure towards a first position in which said movable structure prevents movement of said arm beyond said deployed position, said movable structure being movable against the biasing action of said spring member to a second position in which said movable structure permits movement of the arm beyond said deployed position when an external force applied to said running board exceeds a threshold amount.

2. A power retractable running board assembly according to claim 1, further comprising a spring biased clutch assembly coupling said motor assembly with said running board, said clutch assembly including a first clutch member connected to said arm and a second clutch member driven by said motor assembly, said clutch assembly further comprising spring structure biasing said first and second clutch members into engagement so that movement of said second clutch member when driven by said motor assembly is translated into movement of said first clutch member for movement of said arm and said running board thereof.

3. A power retractable running board assembly for a motor vehicle according to claim 1, wherein said gear assembly comprises a worm gear operatively connected to said motor assembly and a meshing gear operatively connected to said arm, said worm gear and said meshing gear being disposed in cooperative meshing engagement relation, said motor assembly being operable in a first driving direction to drive said worm gear and hence said meshing gear and said arm from said stored position to said deployed position, said arm engaging said stop structure when said arm reaches said deployed position, thereby causing a current spike in said motor assembly as a result of increased resistance to motor assembly movement when said arm engages said stop structure, said motor assembly being constructed to shutoff in response to said current spike, said arm being retained in said deployed position after said motor assembly is shut off as a result of the meshing engagement between said worm gear and said meshing gear, said worm gear being able to resist an external force applied to said running board, in a direction away from said deployed position and towards said stored position, as a result of said meshing engagement.

4. A power retractable running board assembly for a motor vehicle according to claim 3, wherein said motor assembly is constructed and arranged to be connected with a door ajar switch, said motor assembly being energized to move said arm from said stored position to said deployed position upon receiving a signal from said door ajar switch indicating that the vehicle door has been opened, said motor assembly being energized to return said arm to said stored position upon receiving a signal from said door ajar switch indicating that the vehicle door has been closed.

5. A power retractable running board assembly for a motor vehicle according to claim 4, wherein said spring member applies a biasing force to said movable structure that is sufficiently large to oppose the force of said motor assembly so as to cause said current spike in said motor assembly and thereby prevent movement of said movable structure to said second position under the force of said motor assembly, and wherein said biasing force of said spring member permits movement of said movable structure to said second position to enable said arm to move beyond said deployed position when an external force applied to said running board exceeds the force applied by said motor assembly by greater than a threshold amount.

6. A power retractable running board assembly for a motor vehicle according to claim 1, wherein said gear assembly includes a worm gear operatively connected to said motor assembly and a meshing gear being operatively connected to an arm of said parallel linkage, said worm gear and said meshing gear disposed in cooperative meshing engagement relation that prevents said running board from backdriving said motor assembly so that said running board is retained in said deployed position and is inhibited from returning to said stored position after it has reached the deployed position, said power retractable running board assembly further comprising a spring-biased clutch assembly coupling said gear assembly with said running board, said spring-biased clutch assembly including clutch surfaces normally forced into coupling engagement by a spring structure so that movement of said gear assembly generates corresponding movement of said running board, said clutch surfaces being capable of relative movement to one another when said running board is in said deployed position and a force greater than a threshold force is applied to said running board to overcome the force provided by said spring structure, thereby enabling said running board to be moved relative to said gear assembly and thus moved towards said stored position.

7. A power retractable running board assembly according to claim 6, wherein said clutch assembly comprises a first clutch member connected to said arm and a second clutch member forming part of said gear assembly and driven by said motor assembly, said spring structure biasing said first and second clutch members into engagement so that movement of said second clutch member when driven by said motor assembly is translated into movement of said first clutch member and hence said running board.

8. A power retractable running board assembly according to claim 1, further comprising an electronic control unit operably connected with said motor assembly for supplying a motor current to said motor assembly affecting said movement of said running board between said deployed and stored positions, wherein said control unit continuously monitors said motor current and discontinues said motor current when said motor current is outside a characteristic range.

9. A power retractable running board assembly according to claim 2, further comprising an electronic control unit operably connected with said motor assembly for supplying a motor current to said motor assembly affecting said movement of said running board between said deployed and stored positions, wherein said control unit continuously monitors said motor current and discontinues said motor current when said motor current is outside a characteristic range.

10. A power retractable running board assembly according to claim 3, further comprising an electronic control unit operably connected with said motor assembly for supplying a motor current to said motor assembly affecting said movement of said running board between said deployed and stored positions, wherein said control unit continuously monitors said motor current and discontinues said motor current when said motor current is outside a characteristic range.

11. A power retractable running board assembly according to claim 4, further comprising an electronic control unit operably connected with said motor assembly for supplying a motor current to said motor assembly affecting said movement of said running board between said deployed and stored positions, wherein said control unit continuously monitors said motor current and discontinues said motor current when said motor current is outside a characteristic range.

12. A power retractable running board assembly according to claim 5, further comprising an electronic control unit operably connected with said motor assembly for supplying a motor current to said motor assembly affecting said movement of said running board between said deployed and stored positions, wherein said control unit continuously monitors said motor current and discontinues said motor current when said motor current is outside a characteristic range.

13. A power retractable running board assembly according to claim 6, further comprising an electronic control unit operably connected with said motor assembly for supplying a motor current to said motor assembly effecting said movement of said running board between said deployed and stored positions, wherein said control unit continuously monitors said motor current and discontinues said motor current when said motor current is outside a characteristic range.

14. A power retractable running board assembly according to claim 7, further comprising an electronic control unit operably connected with said motor assembly for supplying a motor current to said motor assembly effecting said movement of said running board between said deployed and stored positions, wherein said control unit continuously monitors said motor current and discontinues said motor current when said motor current is outside a characteristic range.

* * * * *